(12) United States Patent
de Pau, Jr.

(10) Patent No.: US 11,149,688 B2
(45) Date of Patent: Oct. 19, 2021

(54) BLOCKER DOOR PRESSURE RELIEF SYSTEMS AND METHODS

(71) Applicant: The Boeing Company, Chicago, IL (US)

(72) Inventor: Robert de Pau, Jr., Kenmore, WA (US)

(73) Assignee: The Boeing Company, Chicago, IL (US)

( * ) Notice: Subject to any disclaimer, the term of this patent is extended or adjusted under 35 U.S.C. 154(b) by 439 days.

(21) Appl. No.: 16/153,508

(22) Filed: Oct. 5, 2018

(65) Prior Publication Data
US 2020/0109683 A1   Apr. 9, 2020

(51) Int. Cl.
| *F02K 1/72* | (2006.01) |
| *B64D 29/06* | (2006.01) |
| *B64D 33/04* | (2006.01) |
| *F02K 1/76* | (2006.01) |
| *B64D 27/18* | (2006.01) |

(52) U.S. Cl.
CPC .............. *F02K 1/72* (2013.01); *B64D 29/06* (2013.01); *B64D 33/04* (2013.01); *F02K 1/763* (2013.01); *B64D 27/18* (2013.01)

(58) Field of Classification Search
CPC ... F02K 1/62; F02K 1/625; F02K 1/70; F02K 1/72; F02K 1/60; F02K 1/605; B64D 29/06; F01D 21/14; F05D 2260/605
See application file for complete search history.

(56) References Cited

U.S. PATENT DOCUMENTS

| 3,571,977 | A | * | 3/1971 | Abeel | .................. E05B 51/023 |
| | | | | | 49/379 |
| 3,721,314 | A | | 3/1973 | Hoch et al. | |
| 5,623,820 | A | | 4/1997 | Balzer et al. | |
| 6,170,254 | B1 | | 1/2001 | Cariola | |
| 8,256,204 | B2 | * | 9/2012 | Hatrick | ..................... F02K 1/72 |
| | | | | | 60/226.2 |
| 8,439,308 | B2 | | 5/2013 | Armstrong et al. | |
| 8,734,211 | B2 | | 5/2014 | Tuchimaa et al. | |
| 2011/0297787 | A1 | * | 12/2011 | Guillaume | ............. B64D 29/06 |
| | | | | | 244/129.4 |
| 2015/0113944 | A1 | | 4/2015 | Pascal et al. | |
| 2017/0022934 | A1 | * | 1/2017 | Caruel | ..................... F02K 1/70 |

* cited by examiner

*Primary Examiner* — Andrew H Nguyen
(74) *Attorney, Agent, or Firm* — Haynes and Boone, LLP

(57) ABSTRACT

An aircraft propulsor with a thrust reverser with a pressure relief system is disclosed herein. The aircraft propulsor can include a flow path and a blocker door configured to block the flow path to divert airflow within the flow path to generate reverse thrust. The blocker door can include a main door and a pressure relief door. The pressure relief door can be coupled to the main door and configured to move from a closed position to an open position in response to flow path pressure greater than a threshold pressure. Moving the pressure relief door to the open position can relieve flow path pressure.

20 Claims, 9 Drawing Sheets

BLOCKER DOOR PRESSURE RELIEF SYSTEMS AND METHODS

TECHNICAL FIELD

The disclosure relates generally to aircrafts and more specifically to aircraft propulsors with thrust reversing systems.

BACKGROUND

Aircraft propulsors can have thrust reversers that aid in the deceleration or reversing of an aircraft. Thrust reversers typically function by moving one or more blocker doors into an air flow path of the aircraft propulsor. The air flow paths typically are pressurized by an engine or fan of the aircraft propulsor and moving the blocker doors into the air flow path would divert some or all of the air flow, producing reverse thrust. In certain situations, the air flow path can be overpressurized. Overpressurization of the air flow path can lead to damage to the blocker doors or another portion of the aircraft propulsor.

SUMMARY

Systems and methods are disclosed for an aircraft propulsor. The aircraft propulsor can include a core engine, an inner panel, an outer nacelle including a thrust reverser opening and a moveable outer panel, a bypass flow path disposed between the core engine and the outer nacelle, and a blocker door configured to move between a retracted position and a deployed position. The blocker door can be configured to direct at least a portion of airflow within the bypass flow path through the thrust reverser opening when in the deployed position. The blocker door can include a main door and a pressure relief door coupled to the main door and configured to move from a closed position to an open position in response to bypass flow path pressure greater than a threshold pressure.

In another example, a blocker door for an aircraft propulsor can be disclosed. The blocker door can include a main door and a pressure relief door, coupled to the main door, and configured to move from a closed position to an open position. The blocker door can be configured to be coupled to a nacelle of the aircraft propulsor and configured to move between a retracted position and a deployed position. The blocker door can be configured to direct at least a portion of airflow within a bypass flow path of the aircraft propulsor through a thrust reverser opening of the aircraft propulsor when in the deployed position. The pressure relief door can be configured to move from the closed position to the open position in response to bypass flow path pressure greater than a threshold pressure.

The scope of the invention is defined by the claims, which are incorporated into this section by reference. A more complete understanding of the disclosure will be afforded to those skilled in the art, as well as a realization of additional advantages thereof, by a consideration of the following detailed description of one or more implementations. Reference will be made to the appended sheets of drawings that will first be described briefly.

BRIEF DESCRIPTION OF THE DRAWINGS

Examples of the disclosure and their advantages are best understood by referring to the detailed description that follows. It should be appreciated that like reference numerals are used to identify like elements illustrated in one or more of the figures.

DETAILED DESCRIPTION

Various examples of aircraft propulsors with thrust reversers with pressure relief systems are described herein. Such an aircraft propulsor can include a core engine and a nacelle that includes a fixed inner panel and a moveable outer panel. The moveable outer panel translates to create a thrust reverser opening. A bypass flow path can be disposed between the fixed inner panel and the moveable outer panel such that they define at least portions of the bypass flow path. The aircraft propulsor can further include a blocker door that includes a main door and a pressure relief door coupled to the main door.

The blocker door can be configured to move between a retracted position and a deployed position. In the deployed position, the blocker door can be configured to direct at least a portion of airflow within the bypass flow path through the thrust reverser opening. The pressure relief door can be configured to move from a closed position to an open position in response to bypass flow path pressure greater than a threshold pressure.

Figure 1:
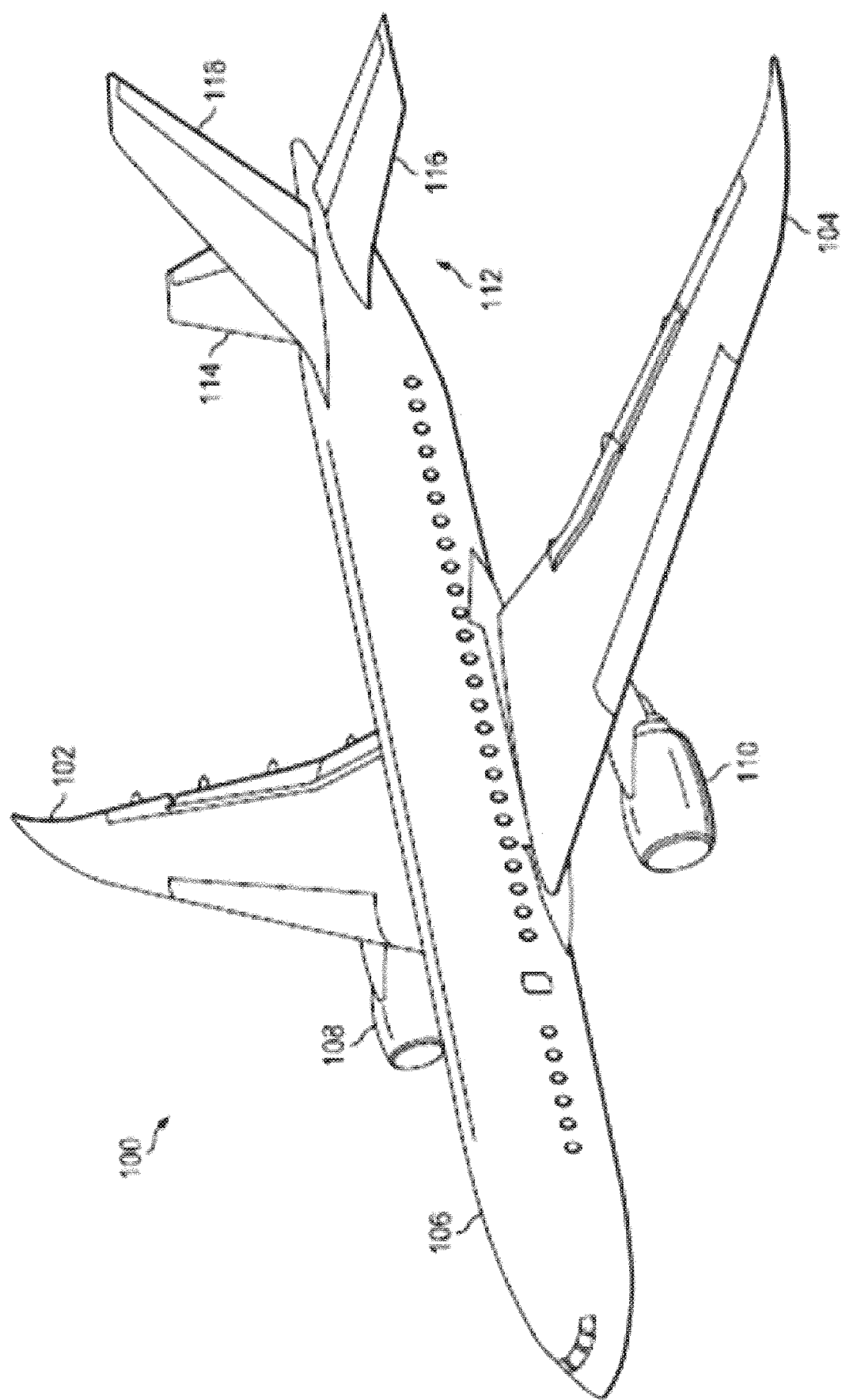
FIG. 1 illustrates an aircraft in accordance with an example of the disclosure.

FIG. 1 illustrates an aircraft in accordance with an example of the disclosure. Aircraft 100 includes wing 102 and wing 104 attached to fuselage 106. Aircraft 100 includes aircraft propulsor 108 attached to wing 102 and engine 110 attached to wing 104. Aircraft 100 also includes tail section 112. Horizontal stabilizer 114, horizontal stabilizer 116, and vertical stabilizer 118 are attached to tail section 112. Aircraft propulsor 108 can be an aircraft propulsor with load bearing moveable panels in accordance with the illustrative examples described herein.

While aircraft 100 is a fixed wing aircraft, in other illustrative examples, aircraft 100 can be some other type of aircraft such as a helicopter or other vertical or short vertical take-off and landing vehicles, a spacecraft, a drone, and/or another type of vehicle.

Figure 2:
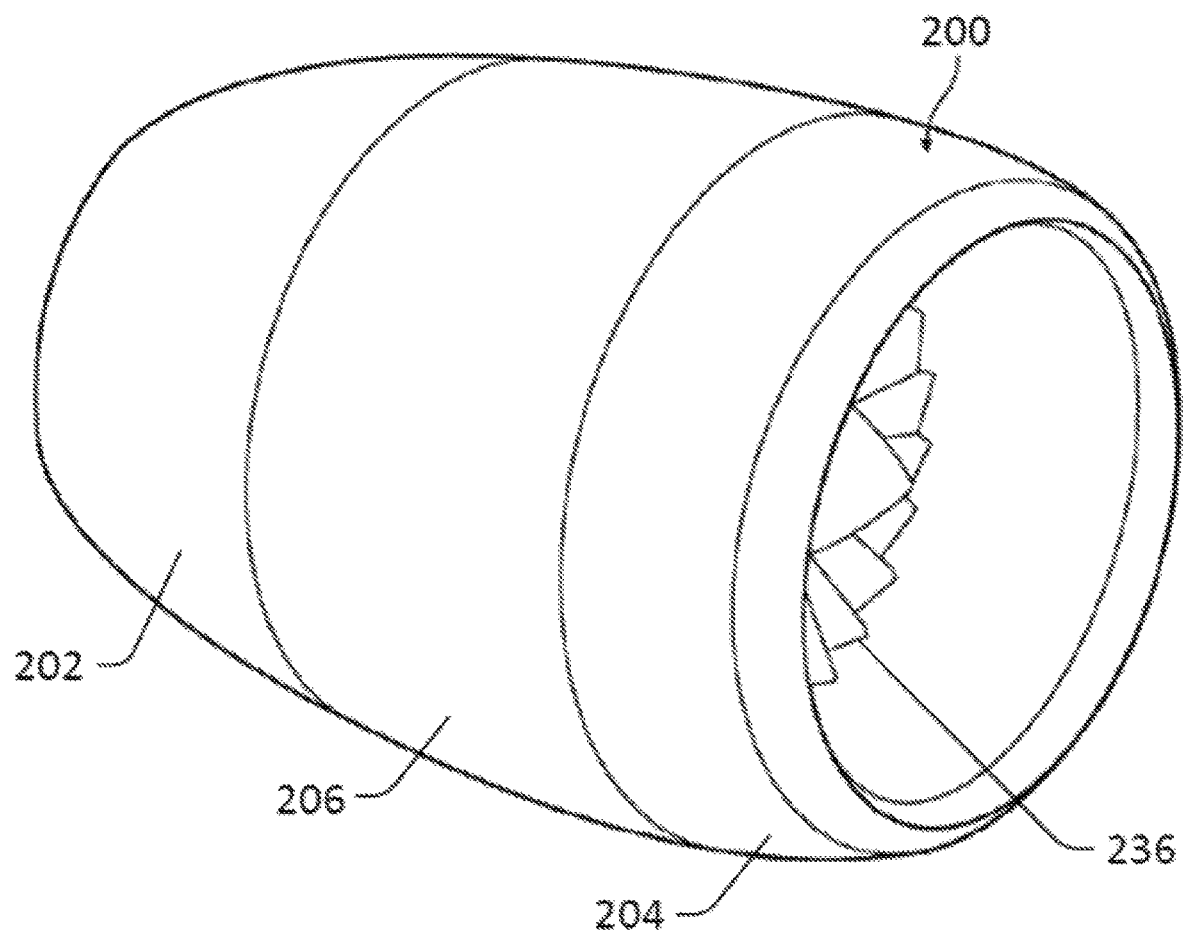
FIG. 2 illustrates an aircraft propulsor in accordance with an example of the disclosure.

FIG. 2 illustrates an aircraft propulsor in accordance with an example of the disclosure. FIG. 2 illustrates aircraft propulsor 200 that includes moveable panel 202, fixed nacelle panels 204 and 206, and core engine 236. Moveable panel 202 and fixed nacelle panels 202 and 204 can collectively constitute an outer nacelle. Moveable panel 202 can be, for example, a panel configured to move to allow for thrust reversing. Moveable panel 202 can, in a closed position, cover a thrust reverser opening and cascades and, in an open position, allow for airflow through the cascades in the thrust reverser opening. Accordingly, when blocker doors (not shown in FIG. 2, but illustrated in FIGS. 3 to 5) are deployed, moveable panel 202 can also move to the open position to allow air deflected by the blocker doors to pass through the cascades in the thrust reverser opening.

Core engine 236 can provide thrust. Core engine 236 can be a turbofan and/or other type of engine with a bypass duct that produces thrust to power an aircraft. Core engine 236 can include combustion components (e.g., combustion chambers), rotational components (e.g., one or more compressors), and/or other components that can produce thrust.

Core engine 236 can generate thrust and/or airflow through one of more air flow paths (e.g., air flow paths where air is mixed with fuel and combusted as well as bypass air flow paths where air is not combusted) that can help provide thrust.

Figure 3:
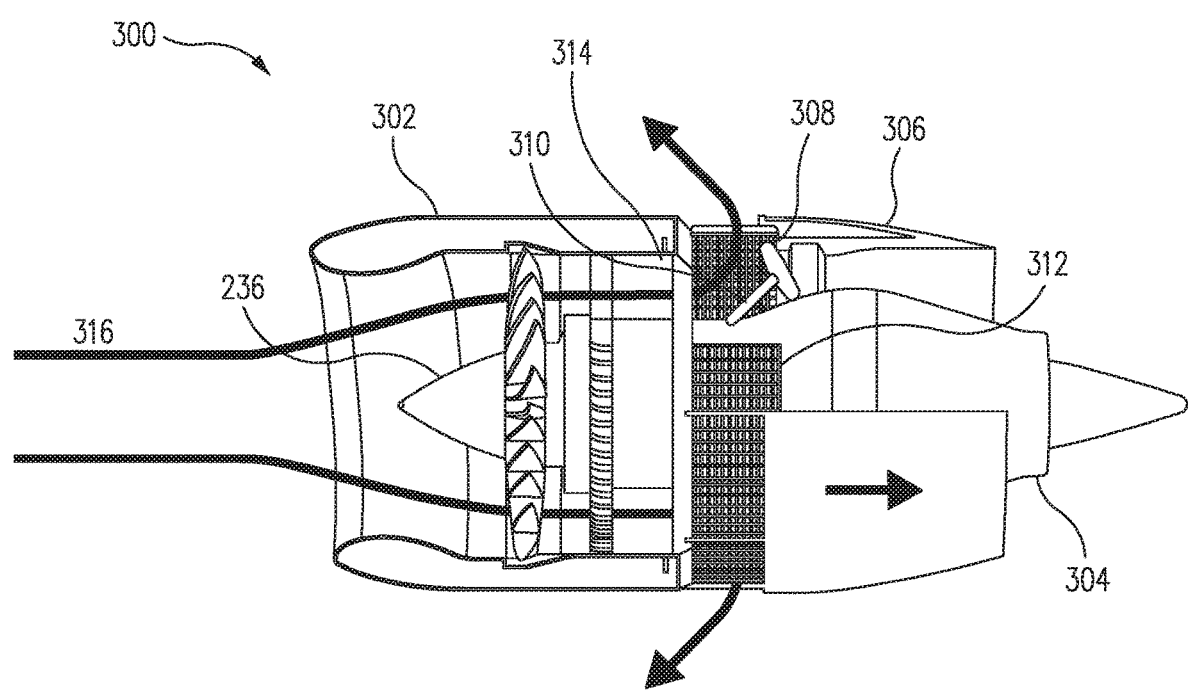
FIG. 3 illustrates a partial cutaway side view of an aircraft propulsor in accordance with an example of the disclosure.

FIG. 3 illustrates a partial cutaway side view of an aircraft propulsor in accordance with an example of the disclosure. FIG. 3 illustrates aircraft propulsor 300 that includes fixed nacelle 302, core engine 236, moveable outer panel 306, inner panel 304, blocker door 308, blocker door link 310, thrust reverser opening and cascades 312, and air flow path 314.

Fixed nacelle 302, core engine 236, and moveable outer panel 306 can be similar to that described in FIG. 2. Core engine 236 can include a fan. The fan can provide airflow 316 through air flow path 314. Air flow path 314 can be at least partially defined by moveable outer panel 306 on an outer side and at least partially defined by inner panel 304 on an inner side. Airflow 316 can be, for example, bypass airflow from core engine 236 (e.g., airflow that has not been mixed with fuel for combustion).

Moveable outer panel 306 can be a hinged, sliding, or other type of moveable panel. Moveable outer panel 306 can move between at least an open position and a closed position. In the closed position, moveable outer panel 306 can fully cover thrust reverser opening and cascades 312 while, in the open position, air can be allowed to flow through cascades in the thrust reverser opening 312 and provide reverse thrust.

Blocker door 308 can move between at least a retracted position and a deployed position. In the retracted position, blocker door 308 can be configured to remain clear of some or all of the airflow within air flow path 314 (e.g., can be configured to not disturb or minimally disturb airflow within air flow path 314). In the deployed position, blocker door 308 can be configured to direct at least a portion of airflow within air flow path 314 through the cascades in the thrust reverser opening 312. Thus, when blocker door 308 is in the deployed position and moveable outer panel 306 is in the open position, blocker door 308 can re-direct airflow within air flow path 314 through cascades in the thrust reverser opening 312 to provide reverse thrust.

Movement of blocker door 308 can be actuated by or controlled by blocker door link 310. The forward portion of blocker door 308 is coupled to the outer flow surface of the bypass duct (e.g., air flow path 314) with hinges. Blocker door link 310 is coupled to blocker door 308 at one end and inner panel 304 at the other end. Thus, for example, a central portion of blocker door 308 is coupled to one end of blocker door link 310, which can be referred to as a "drag link." Blocker door link 310 can move blocker door 308 between the retracted position and the deployed position, as well as positions between the retracted and deployed positions. Thus, for example, an end of the drag link is connected to the inner flow surface of the bypass duct (e.g., inner panel 304). When moveable outer panel 306 translates backwards, the drag link can then pull blocker door 308 down into air flow path 314.

Figure 4A:
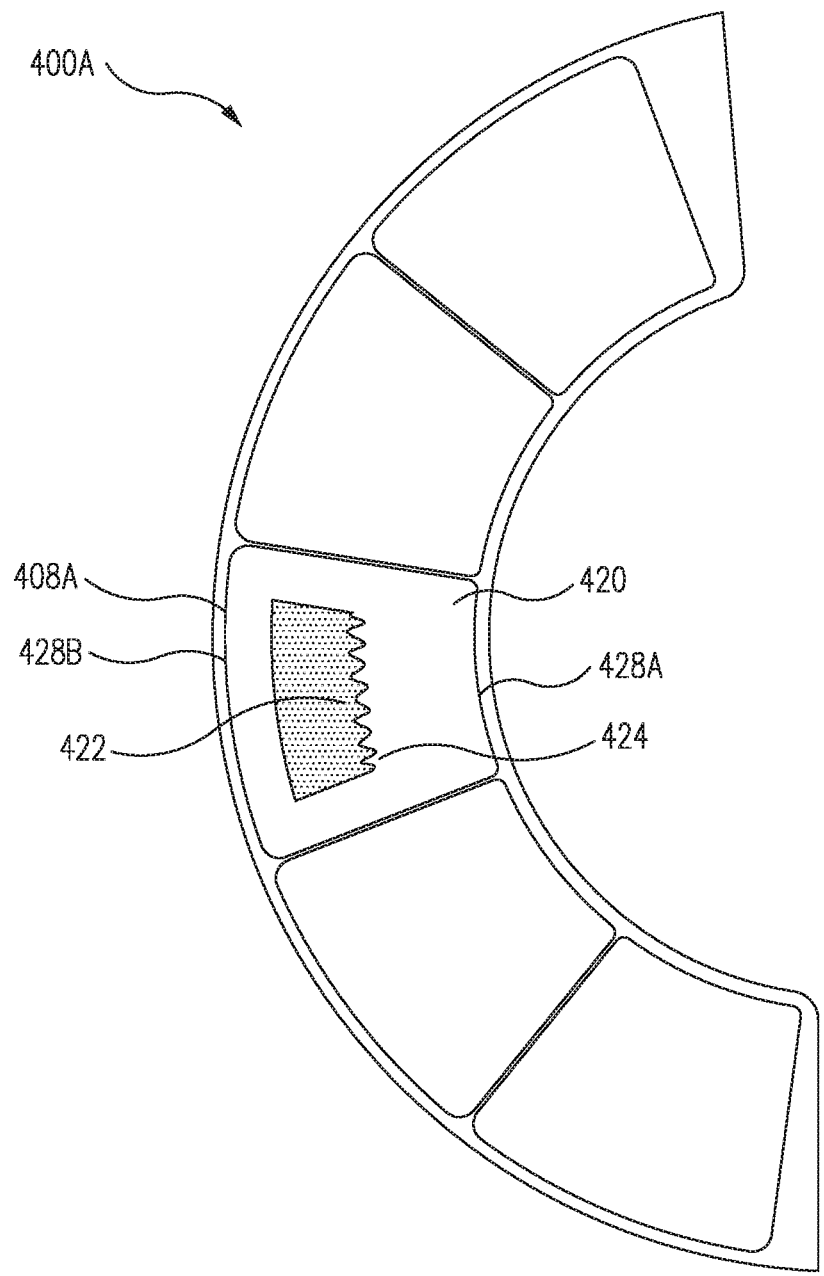
FIGS. 4A-D illustrate front views of blocker doors in accordance with examples of the disclosure.

FIGS. 4A-D illustrate front views of blocker doors in accordance with examples of the disclosure. FIG. 4A illustrates aircraft propulsor 400A with a plurality of blocker doors including blocker door 408A. Blocker door 408A includes main door 420 and pressure relief door 422. Blocker door 408A can be hinged to the outer flow surface of the nacelle bypass duct at end 428B. Blocker door 408A can be moved by the blocker door link, one or more motors, actuators, and/or other components either directly or indirectly (e.g., via one or more links).

Blocker door 408A, including main door 420 and pressure relief door 422, can be moved between a retracted position and a deployed position. In certain situations, moving blocker door 408A into an air flow path can result in a high amount of pressure being applied to at least a portion of blocker door 408A from airflow within the air flow path. With conventional blocker doors, such high pressure can result in damage to the doors, nacelle, core engine, and/or another portion of the aircraft propulsor.

The blocker doors described herein can include a pressure relief door to relieve pressure (e.g., from the blocker door and/or within the air flow path) and prevent damage. Main door 420 can include a relief door opening. Pressure relief door 422 can be configured to block the relief door opening when in the closed position and allow airflow through the relief door opening when in the open position. Furthermore, pressure relief door 422 can be configured to open if blocker door 408A experiences a pressure greater than a threshold pressure (e.g., pressure from airflow within the air flow path). Thus, when the pressure within the air flow path is less than or equal to the threshold pressure, pressure relief door 422 can be closed and blocker door 408A can redirect the airflow within the air flow path as normal to generate reverse thrust. When the pressure within the air flow path is greater than the threshold pressure, pressure relief door 422 can open to allow for a portion of the airflow to bypass blocker door 408A and flow through the relief door opening instead. The threshold pressure can be a pressure that would not result in damage to components of aircraft propulsor 400A. Thus, pressure relief door 422 can reduce pressure on blocker door 408A and other components of aircraft propulsor 400A before such pressure rises to a damaging level and, thus, prevent damage to components of aircraft propulsor 400A.

Pressure relief door 422 can be coupled to main door 420 via one or more hinges 424 or other connection techniques. Hinges 424 can be spring loaded (e.g., can include a spring such as a torsion spring). Spring force from spring loaded hinge 424 can be configured to hold pressure relief door 422 against main door 420 when blocker door 408A is subjected to pressure below or equal to the threshold pressure, but can be configured to allow pressure relief door 422 to open (e.g., a portion of pressure relief door 422 can move away from main door 420) when blocker door 408A to reduce pressure on blocker door 408A.

In other examples, pressure relief door 422 can be coupled to main door 420 via other techniques (e.g., via one or more straps, latches, adhesives, magnets, connectors, welding, stitching, actuators, and/or other techniques). While the example shown in FIG. 4A can allow for pressure relief door 422 to return to a position against main door 420 when the pressure experienced by blocker door 400A has reduced to a below the threshold pressure, other examples can still keep at least a portion of pressure relief door 422 away from main door 420. Thus, certain examples can require the pressure relief door 422 to be manually set against main door 420 after pressure relief door 422 opens.

As shown in FIG. 4A, pressure relief door 422 can be disposed closer to end 428B of blocker door 408A. In other examples, pressure relief door 422 can be disposed at other portions of blocker door 408A.

Figure 4B:
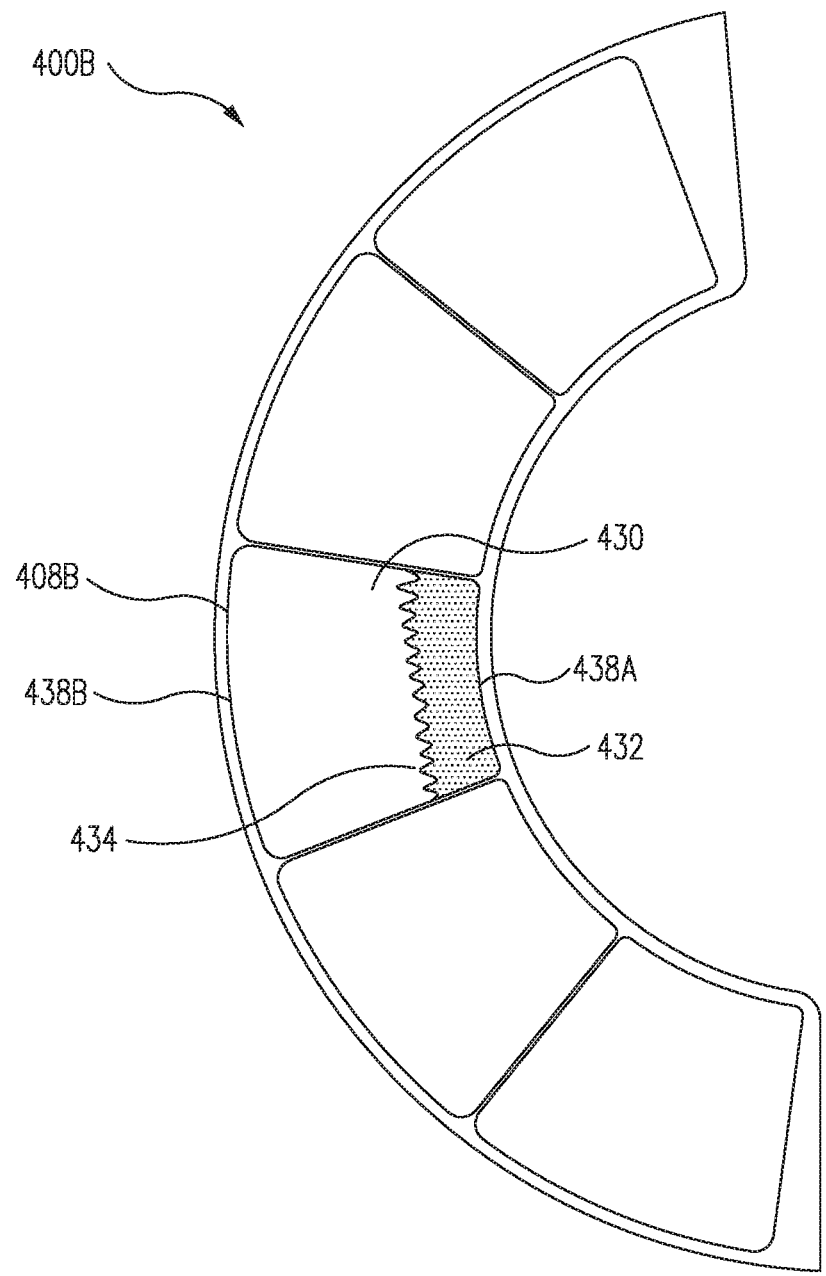

Such an example can be shown in, for example, aircraft propulsor 400B of FIG. 4B. Aircraft propulsor 400B includes blocker door 408B that includes main door 430 and pressure relief door 432 coupled to main door 430 via hinges 434. Pressure relief door 432 can be coupled to main door 430 at the portion of main door 430 near end 438A, closer to the inner panel, instead of near end 438B, closer to the moveable outer panel of the nacelle.

Referring back to the example shown in FIG. 4A, pressure relief door 422 is disposed within main door 420. Thus, a perimeter of the relief door opening is surrounded by the body of main door 420. By contrast, main door 430 does not include a relief door opening. Instead, pressure relief door 432 can be disposed on an end of main door 430. Such a configuration can simplify manufacturing, but can require stop features on main door 430 or another component of the aircraft professor (e.g., on the nacelle or core engine) to prevent over-rotation of pressure relief door 422 from hinges 434. Nonetheless, pressure relief door 432 is coupled to main door 430 via hinges 434 and can still be configured to open if blocker door 408B experiences a pressure greater than a threshold pressure.

Figure 4C:
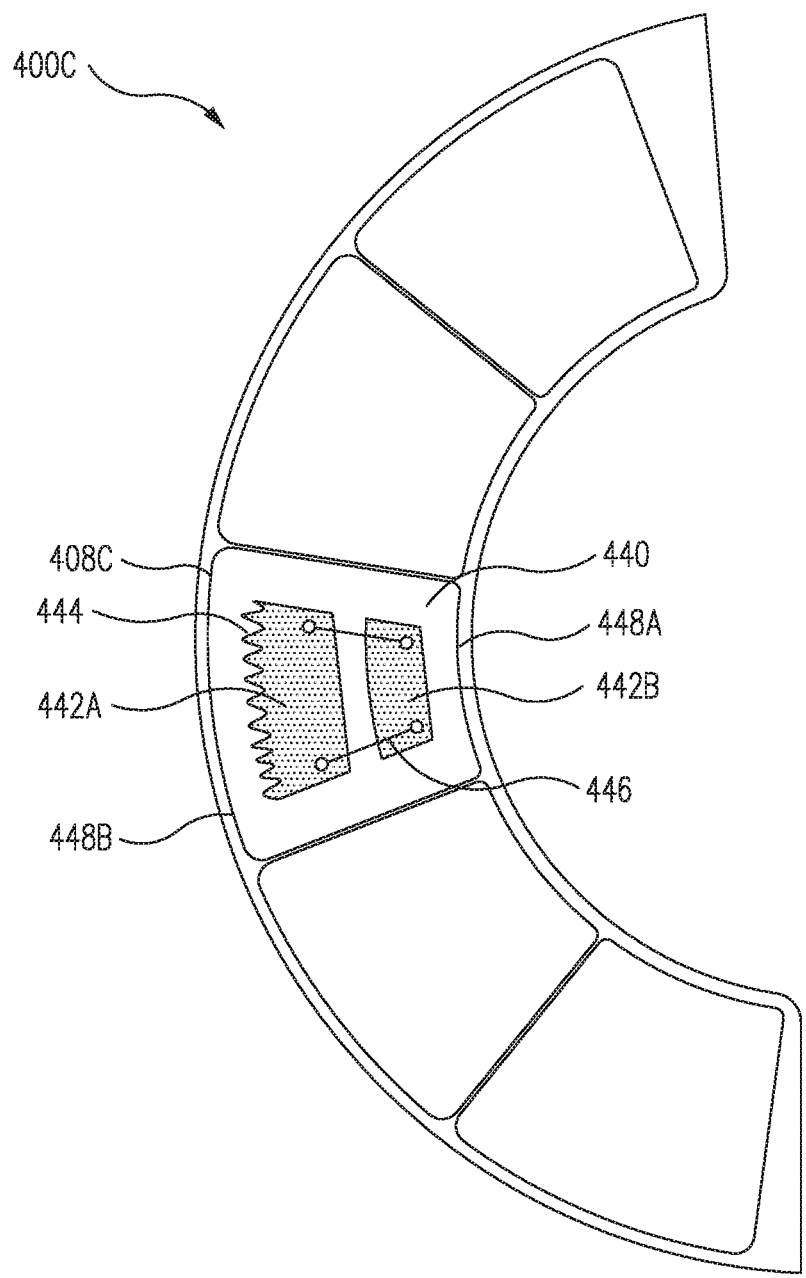

In certain examples, the blocker door can include a plurality of pressure relief doors. Such a configuration is shown in FIG. 4C, which illustrates blocker door 400C that includes main door 440 and a plurality of pressure relief doors 442A and 442B.

Pressure relief doors 442A and 442B can be disposed on different portions of main door 440. In certain examples, pressure relief doors 442A and 442B can be coupled together (e.g., via links 446). Accordingly, opening of one of pressure relief doors 442A or 442B can cause the opening of the other of pressure relief doors 442A or 442B as movement of pressure relief doors 442A and 442B are linked.

In certain examples, only one or some of a plurality of linked pressure relief doors includes a spring hinge or other mechanism that provides force to hold pressure relief doors 442A and 442B against main door 440. Thus, for example, pressure relief door 442A can include spring hinge 444, but pressure relief door 442B can not include a spring hinge or mechanism directly connected to pressure relief door 442B to impart force to hold pressure relief door 442B against main door 440. Spring hinge 444 would then provide all of the holding force for both pressure relief doors 442A and 442B.

In certain other examples, some or all of the pressure relief doors can include separate mechanisms for holding the pressure relief doors against the main door. Such a configuration is shown in FIG. 4D.

Figure 4D:
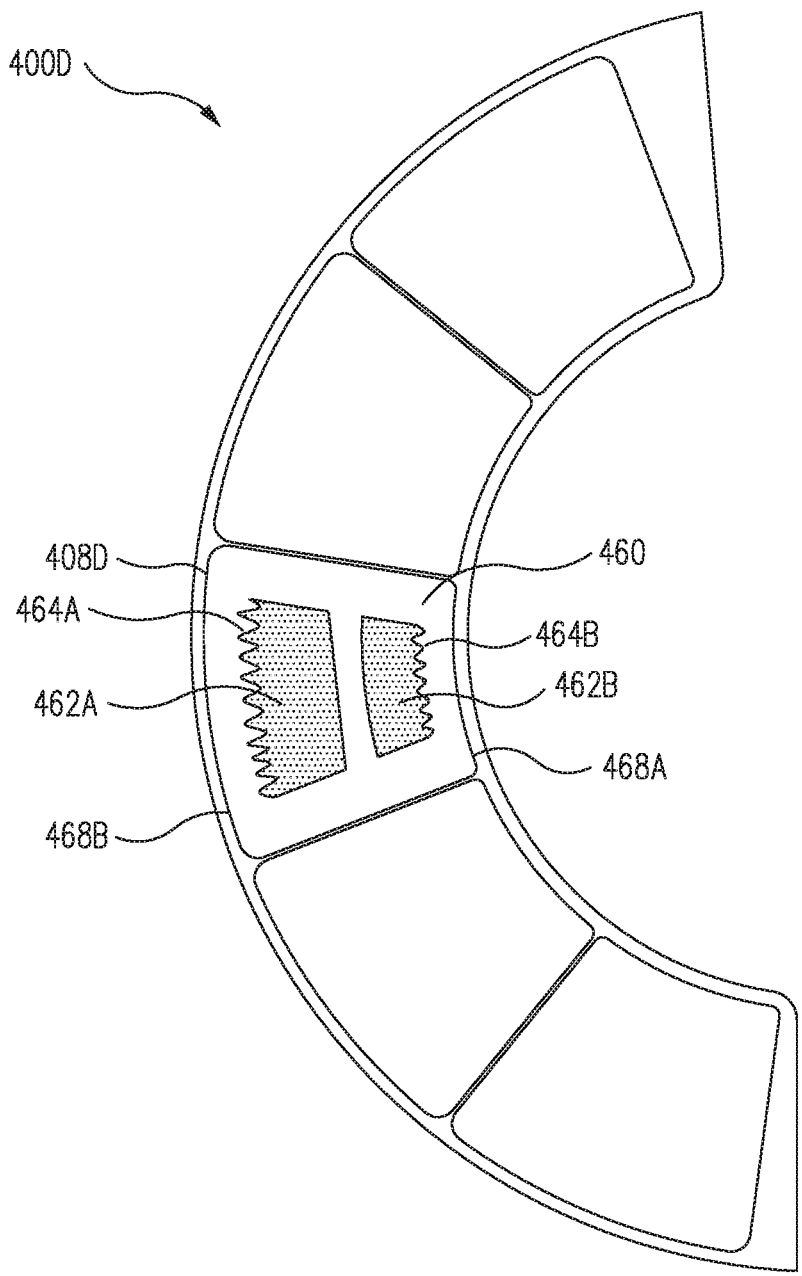

FIG. 4D illustrates main door 460 with a plurality of pressure relief doors 462A and 462B. Each of pressure relief doors 462A and 462B can be coupled to main door 460 via hinges 464A and 464B, respectively. Hinges 464A and 464B can be one or more spring hinges or other mechanisms that provide force to hold pressure relief doors 462A and 462B against main door 460. Pressure relief door 462A can be disposed closer to end 468B while pressure relief door 462B can be disposed closer to end 468A.

Such mechanisms can allow for the plurality of pressure relief doors 462A and 462B to move independently of each other. Furthermore, in certain such examples, pressure relief doors 462A and 462B can be configured to open at different pressure values. Thus, pressure relief door 462A can be configured to open when pressure is higher than a first threshold pressure and pressure relief door 462B can be configured to additionally open when pressure is higher than a second threshold pressure greater than the first threshold pressure. In such a configuration, a greater number of pressure relief doors can open at greater pressures to provide additional relief at greater pressures.

Figure 5:
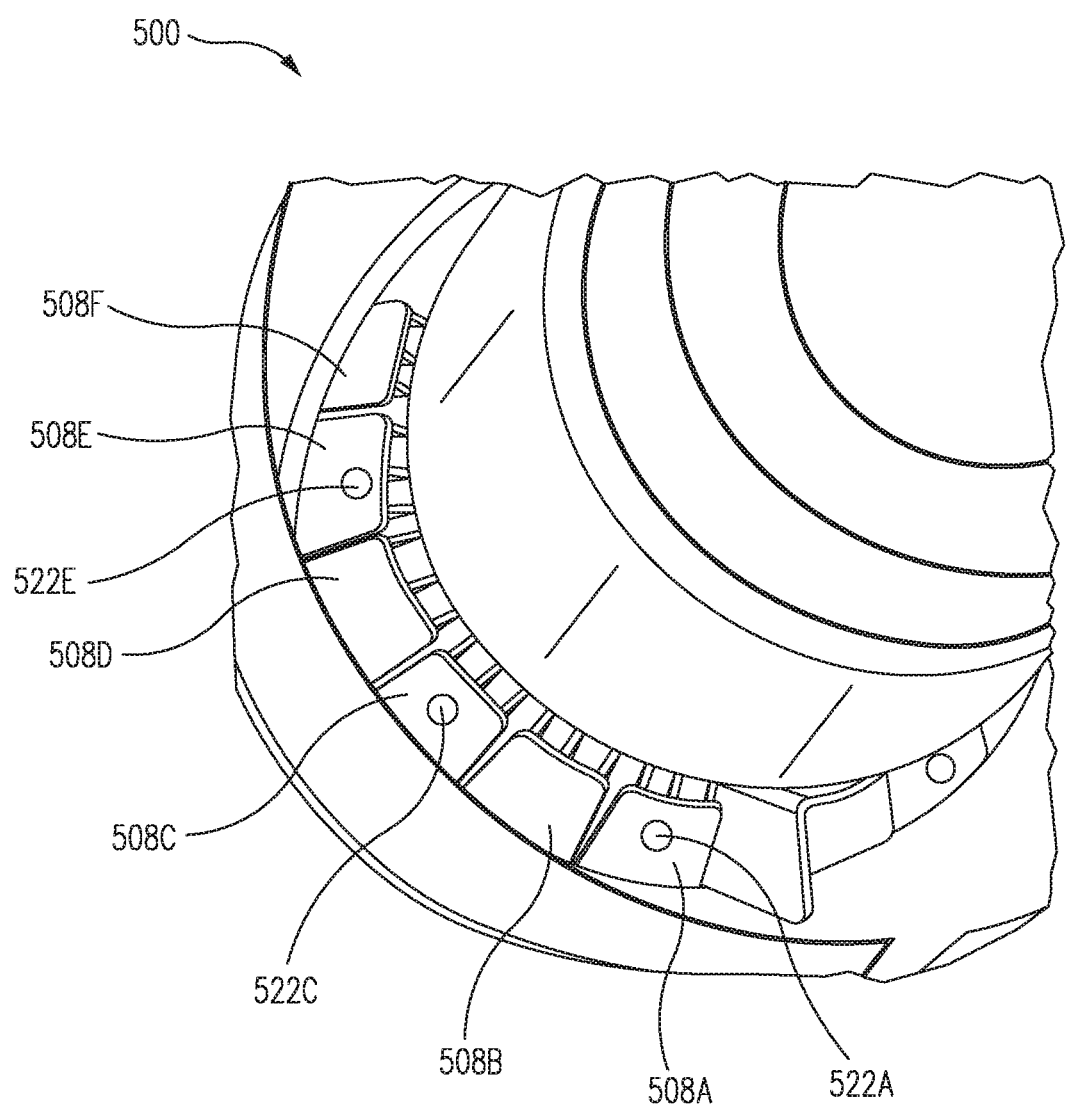
FIG. 5 illustrates a view of a rear of an aircraft propulsor in accordance with an example of the disclosure.

FIG. 5 illustrates a view of a rear of an aircraft propulsor in accordance with an example of the disclosure. FIG. 5 illustrates aircraft propulsor 500 that includes blocker doors 508A-F. Some, but not all, of blocker doors 508A-F include pressure relief doors. For example, blocker doors 508A, 508C, and 508E include pressure relief doors 522A, 522C, and 522E, but blocker doors 508B, 508D, and 508F do not include pressure relief doors.

As shown in FIG. 5, as certain blocker doors can include pressure relief doors while other blocker doors do not, the amount of blocker doors with pressure relief doors can be configured to provide the needed pressure relief. Thus, the number of blocker doors with pressure relief doors can be changed by adding or removing such doors as needed to provide the appropriate pressure relief, depending on the expected maximum overpressure of the aircraft propulsor. As such, aircraft propulsors that can generate greater bypass pressures can include a greater number of blocker doors with pressure relief doors. In certain examples, a blocker door without a pressure relief door can be replaced with a blocker door with a pressure relief door, or vice versa, to arrive at the appropriate configuration.

Figure 6:
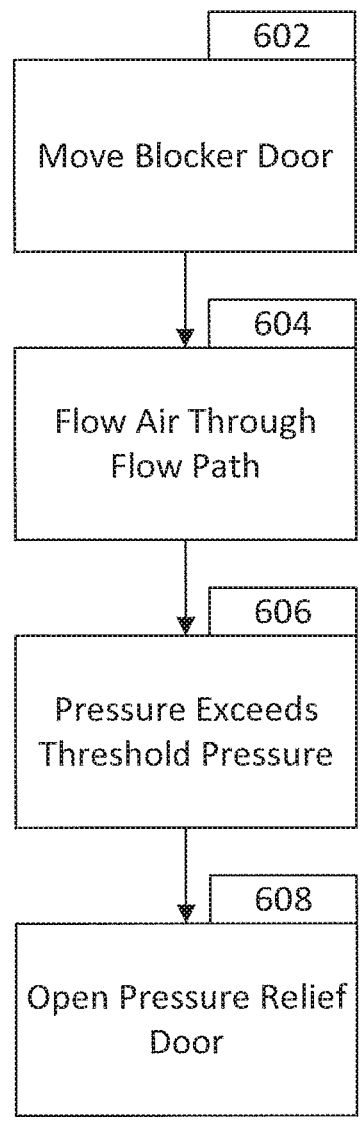
FIG. 6 is a block diagram detailing a process of operating the aircraft propulsor in accordance with an example of the disclosure.

FIG. 6 is a block diagram detailing a process of operating the aircraft propulsor in accordance with an example of the disclosure. FIG. 6 illustrates a process during thrust reversing where pressure relief doors are utilized to prevent damage to an aircraft propulsor.

In block 602, a blocker door of an aircraft propulsor can be moved from a retracted position to a deployed position with an air flow path. Air can then be flowed through the air flow path in block 604 and deflected by the deployed blocker door to generate reverse thrust.

In block 606, pressure from the airflow (e.g., against the blocker door) can be greater than a threshold pressure. In response to the pressure being greater than the threshold pressure, the pressure relief door can open in block 608 to relieve the pressure and prevent damage to the aircraft propulsor.

Examples described above illustrate but do not limit the invention. It should also be understood that numerous modifications and variations are possible in accordance with the principles of the present invention. Accordingly, the scope of the invention is defined only by the following claims.

What is claimed is:

1. An aircraft propulsor comprising:
a core engine;
an inner panel;
an outer nacelle comprising a thrust reverser opening and a moveable outer panel;
a bypass flow path disposed between the inner panel and the outer nacelle; and
a blocker door configured to move between a retracted position and a deployed position, wherein the blocker door is configured to direct at least a portion of airflow within the bypass flow path through the thrust reverser opening when in the deployed position, and wherein the blocker door comprises:
a main door, and a pressure relief door coupled to the main door and configured to move from a closed position to an open position in response to bypass flow path pressure greater than a threshold pressure.

2. The aircraft propulsor of claim 1, wherein the pressure relief door is coupled to the main door by a spring hinge.

3. The aircraft propulsor of claim 2, wherein a spring rate of the spring hinge is configured to hold the pressure relief door against the main door in response to pressure against the pressure relief door less than the threshold pressure.

4. The aircraft propulsor of claim 2, wherein the spring hinge comprises a torsional spring.

5. The aircraft propulsor of claim 1, wherein the main door comprises a main door first end and a main door second end, and wherein the pressure relief door is disposed on the main door second end.

6. The aircraft propulsor of claim 1, wherein the main door comprises a main door body and a relief door opening, wherein a perimeter of the relief door opening is surrounded by the main door body, and wherein the pressure relief door is configured to block the relief door opening when in the closed position.

7. The aircraft propulsor of claim 1, where the blocker door is a first blocker door and further comprising a second blocker door lacking a pressure relief door and configured to move between the retracted position and the deployed position.

8. The aircraft propulsor of claim 1, wherein the pressure relief door is one of a plurality of pressure relief doors, and the blocker door comprises the plurality of pressure relief doors.

9. The aircraft propulsor of claim 8, wherein the plurality of pressure relief doors are coupled to each other and configured to move substantially concurrently with each other.

10. The aircraft propulsor of claim 9, wherein each of the plurality of pressure relief doors are configured to move from the closed position to the open position in response to bypass flow path pressure greater than the threshold pressure.

11. The aircraft propulsor of claim 8, wherein the plurality of pressure relief doors are configured to move independently of each other, and wherein the threshold pressure is one of a plurality of threshold pressures each associated with a respective pressure relief door of the plurality of pressure relief doors, and each pressure relief door is configured to move from the closed position to the open position when the bypass flow path pressure exceeds the associated threshold pressure.

12. An aircraft comprising the aircraft propulsor of claim 1, wherein the aircraft further comprises:
a fuselage; and
a wing, wherein the aircraft propulsor is coupled to the fuselage and/or the wing;
wherein in the deployed position, the blocker door at least partially blocks the bypass flow path, and the pressure relief door is configured to move from the closed position to the open position to relieve pressure from the blocker door and/or within the bypass flow path.

13. A method of operating the aircraft propulsor of claim 1, the method comprising:
moving the blocker door from the retracted position to the deployed position; and
operating the core engine to flow air through the bypass flow path at a pressure greater than the threshold pressure to move the pressure relief door from the closed position to the open position.

14. The method claim 13, wherein the pressure relief door is in the closed position when the blocker door is moved from the retracted position to the deployed position.

15. A blocker door for an aircraft propulsor, the blocker door comprising:
a main door, and a pressure relief door, coupled to the main door, and configured to move from a closed position to an open position, wherein:
the blocker door is configured to be coupled to a nacelle of the aircraft propulsor and configured to move between a retracted position and a deployed position;
the blocker door is configured to direct at least a portion of airflow within a bypass flow path of the aircraft propulsor through a thrust reverser opening of the aircraft propulsor when in the deployed position; and
the pressure relief door is configured to move from the closed position to the open position in response to bypass flow path pressure greater than a threshold pressure.

16. The blocker door of claim 15, wherein the pressure relief door is coupled to the main door by a spring hinge, and wherein a spring rate of the spring hinge is configured to hold the pressure relief door against the main door in response to pressure against the pressure relief door less than the threshold pressure.

17. The blocker door of claim 16, wherein the spring hinge comprises a torsional spring.

18. The blocker door of claim 15, wherein the pressure relief door is one of a plurality of pressure relief doors, and the blocker door comprises the plurality of pressure relief doors.

19. The blocker door of claim 18, wherein the plurality of pressure relief doors are coupled to each other and configured to move concurrently with each other, and wherein each of the plurality of pressure relief doors are configured to move from the closed position to the open position in response to bypass flow path pressure greater than the threshold pressure.

20. The blocker door of claim 18, wherein the plurality of pressure relief doors are configured to move independently of each other, and wherein the threshold pressure is one of a plurality of threshold pressures each associated with a respective pressure relief door of the plurality of pressure relief doors, and each pressure relief door is configured to move from the closed position to the open position when the bypass flow path pressure exceeds the associated threshold pressure.

* * * * *